July 6, 1926.
P. J. WOTZKA
TRAILER TONGUE
Filed Sept. 26, 1922
1,591,201
2 Sheets-Sheet 2
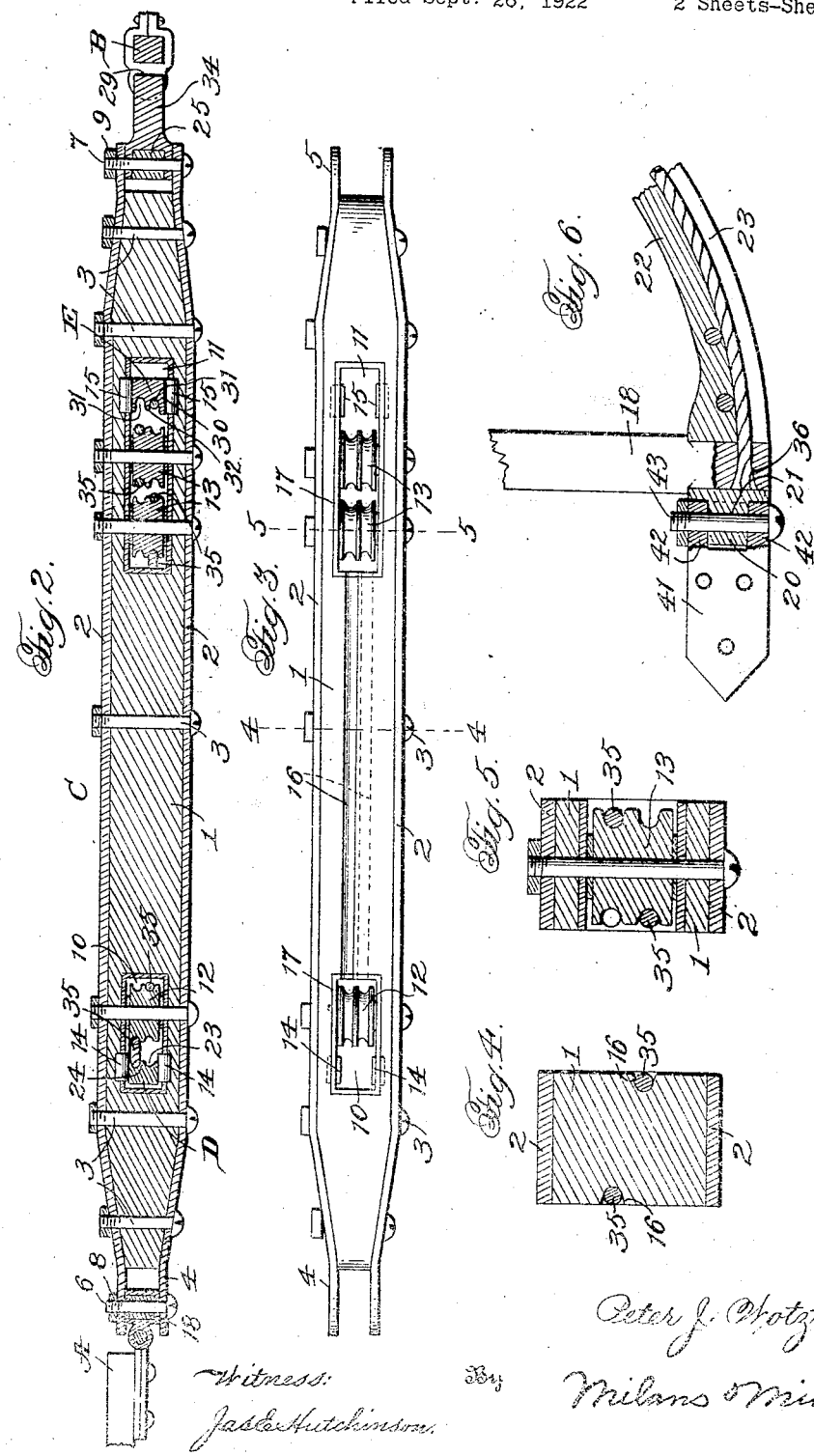

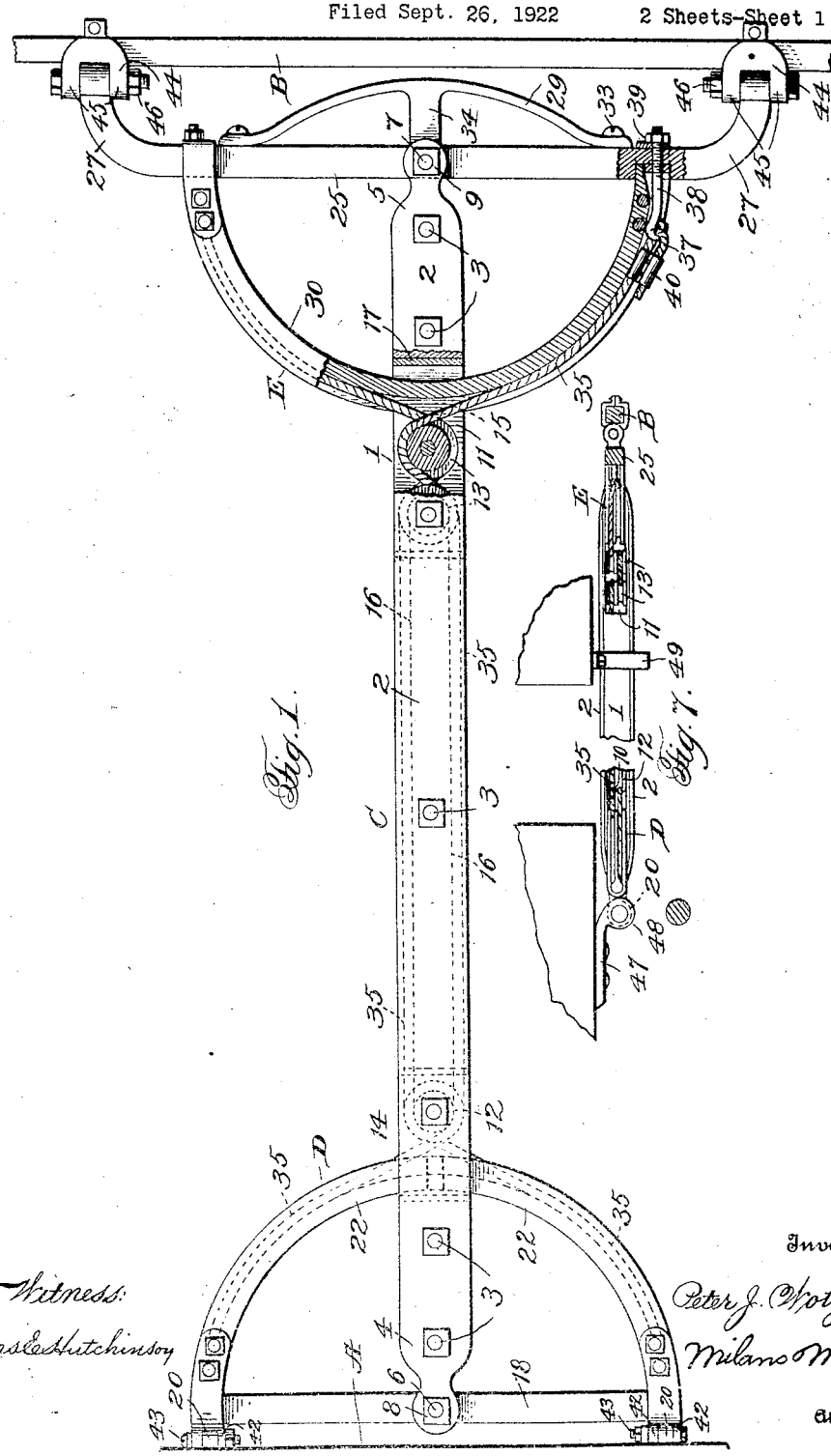

Patented July 6, 1926.

1,591,201

UNITED STATES PATENT OFFICE.

PETER J. WOTZKA, OF LONG PRAIRIE, MINNESOTA.

TRAILER TONGUE.

Application filed September 26, 1922. Serial No. 590,639.

My invention relates to new and useful improvements in trailer tongues and has for its principal object the provision of a tongue adapted to be connected between a motor truck or other vehicle and a trailer, or between two trailers so that the trailers will follow the course of the front or preceding vehicle, the tongue being so constructed that short turns may be made and its use is adapted with trailers of the two or four wheel types.

A further object resides in reinforcing the tongue and so connecting the several parts as to overcome excessive friction, the forward and rearward pivoted members being connected by cables secured thereto in a novel manner.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention as they now appear to me it will be understood that such changes may be made as will fall within the scope of the appended claims.

In the drawings:—

Fig. 1 is a top plan with parts shown in horizontal section.

Fig. 2 is a longitudinal vertical section.

Fig. 3 is a side elevation.

Fig. 4 is a transverse vertical section on the line 4—4 of Fig. 3.

Fig. 5 is a transverse vertical section on the line 5—5 of Fig. 3.

Fig. 6 is a fragmental top plan with parts in horizontal section showing the manner of connecting the actuating cable, and Fig. 7 is a fragmental side elevation of a slightly modified form of the invention.

In the drawings A indicates the rear end of a motor truck or similar vehicle and B indicates the front or steering axle of a trailer, the tongue indicated generally at C being secured between the two vehicles so that the trailer will follow the front vehicle at all times.

The tongue consists of the bar 1, preferably of wood, reinforced by the top and bottom metal plates 2 secured thereto by nuts and bolts 3 or similar securing means, the ends of the metal plates extending beyond each end of the bar 1, as shown at 4 and 5, and the extensions being provided with vertical openings to receive the bolts 6 and 7 respectively carrying the nuts 8 and 9 for a purpose to be later described. The bar 1 is provided adjacent one end with an elongated opening 10 and adjacent the opposite end with the elongated opening 11, the opening 10 having the horizontally rotatable double grooved roller 12 mounted therein and the opening 11 having the longitudinally spaced horizontally rotatable double grooved pulleys 13 mounted therein. Also mounted in the opening 10 are the rollers 14 and mounted in the opening 11 are the rollers 15, the purpose of which will be presently set forth, it being noted that one of the rollers in each opening protrudes from the upper face of the opening and the other protrudes from the lower face thereof. On each side of the bar 1 is formed a longitudinally extending groove 16, said groove extending between and leading to the openings 10 and 11. The openings are preferably reinforced by the metal casings shown at 17 but if desired said casings may be done away with.

Pivotally connected to the forward end of the tongue is the member D and pivotally connected to the rear end is the member E. The member D comprises the cross bar 18 which is received between the extended ends 4 of the plates 2 and pivotally connected thereto by means of the bolt, the forwardly projecting transversely spaced lugs 20 having the longitudinal openings 21 therethrough, and the arcuate shaped bar or guide 22 which passes through the opening 10 between and in contact with the rollers 14. The bar or guide 22 is formed on its convex face with a double groove 23, the partition 24 forming the two grooves extending to a point adjacent the cross bar 18.

The member E comprises the cross bar 25 which is received between the extended ends 5 of the plates 2 and pivotally connected thereto by means of the bolt 7, the ends of the bar being bent at right angles to form the extensions 27 each having a horizontal opening 28 therethrough, the brace 29, and the arcuate shaped bar or guide 30 which passes through the opening 11 between and in contact with the rollers 15. The bar or guide 30 is formed on its convex face with a double groove 31 the partition 32 of which terminates a short distance from the bar 25 for a purpose which will later appear. The brace 29 is of bow shape, the ends being secured to the bar 25 by the bolts and nuts 33. Intermediate the ends the brace is formed with a projection 34 which is bifurcated and straddles the bar 25, the pivot bolt 7 passing therethrough. The members D and E are connected and operated in unison by the cables 35, the forward ends of the cables extending into openings 36 formed in the cross bar 18, in which they are secured and the opposite ends being looped as shown at 37 and connected to the bolts 38 which extend through the cross bar 25 and are adjustable by the nuts 39 to tighten the cables. The looped ends of the cable are connected by the clasps 40 and the cables extend into the grooves of the arcuate guide bars 22 and 30 and around the pulleys 12 and 13 as quite clearly shown in the drawings. The partition forming the notches in the arcuate bar 30 terminating short of the bar 25 allows room for the adjustment of the cable connecting bolts 38.

The forward pivoted member D is connected to the motor truck or similar vehicle A by the plates 41 which are secured to the under side of the bottom of the vehicle, these plates being provided with spaced eyes 42 to receive therebetween the lugs 20 to which they are connected by means of the bolts and nuts 43. The rear pivoted member E is connected to the trailer axle B by means of the clamps 44 which have the spaced eyes 45 to receive therebetween the extensions 27 of the cross bar 25 to which they are connected by means of the bolts and nuts 46.

The construction above described is primarily adapted for use with trailers of the four wheel type and when it is desired to use the same with trailers of a two wheel type a little different connection will have to be made for the forward end of the tongue. When used with the two wheel trailers the forward end of the tongue will be connected to the plates 47 (see Fig. 7) which will be secured to the under side of the trailers, just above the axle, these plates having the eyes 48 to receive the lugs 20 of the member D. The rear end of the tongue will be secured to the trailer's axle in the manner previously described. In order to prevent the two wheel trailer from tipping over it is provided at the forward end with the guide 49 through which the bar 1 extends.

In the drawings, I have illustrated the arcuate shaped bars 22 and 30, of the members D and E respectively, of the same size but at times it will be found desirable to increase or decrease the size of the bar 30. In using two wheel trailers it might be desirable to make the bar 30 somewhat larger than the bar 22 so that the wheels of the trailer will not go too far around when turning corners. When hauling long boards or the like it might be found desirable to make the bar 30 somewhat smaller than the bar 22 so that the front wheels of the trailer will cut out further than the wheels of the truck.

From the above detailed description it is thought that the construction and operation of my device will be clearly understood. It will be seen that I have provided an improved form of tongue adapted for connection between a motor truck or similar vehicle and a trailer or between two trailers so that the trailer will follow at all times the course of the front vehicle or one trailer will follow the preceding trailer. The pivoted members D and E are operated in unison by the cables 35. The cables may be adjusted by the bolts 38 and nuts 39 and excessive friction is overcome by the pulleys 12 and 13 and the rollers 14 and 15. The device is also adapted for trailers having two or four wheels and may be connected to and detached from the vehicle and trailer at will thereby making it interchangeable. The cable will be received in the longitudinally extending grooves 16, in the sides of the bar 1, as quite clearly shown in the drawings.

Having fully described my invention what I claim as new and desire to secure by Letters Patent is:

1. A device of the character described for connecting vehicles in tandem comprising a longitudinally extending bar having a transversely extending opening adjacent each end, a transversely extending bar pivotally connected adjacent each end of the longitudinal bar, a guide bar carried by each transversely extending bar, one guide bar extending through each opening in the longitudinally extending bar, and means connecting the transversely extending bars so that one will be operated upon movement of the other.

2. A device of the character described for connecting vehicles in tandem comprising a longitudinally extending bar having a transversely extending opening adjacent each end, rollers mounted in the openings, a transversely extending bar pivotally connected adjacent each end of the longitudinally extending bar, a guide bar carried by each transversely extending bar, one guide bar extending through each opening in the longitudinal bar and in contact with the rollers therein, and means connecting the transversely extending bars so that one will be operated upon movement of the other.

3. A device of the character described for connecting vehicles in tandem comprising a longitudinally extending bar, a transversely extending bar pivotally connected adjacent each end of the longitudinally extending bar, a grooved arcuate shaped guide bar carried by each transversely extending bar, and cables connecting the transversely extending bars so that one will be operated upon movement of the other, the cables received and operating in the grooves of the arcuate shaped guide bars.

4. A device of the character described for connecting vehicles in tandem comprising a longitudinally extending bar, pulleys carried by the bar intermediate its ends, a transversely extending bar pivotally connected adjacent each end of the longitudinally extending bar, a grooved arcuate shaped guide bar carried by each transversely extending bar, and cables connecting the transversely extending bars so that one will be operated upon movement of the other, the cables being received in the grooves of the arcuate shaped guide bars and operating around the pulleys.

5. A device of the character described for connecting vehicles in tandem comprising a longitudinally extending bar, a pivoted member detachably connected to one end of the bar for detachable connection to one vehicle, a pivoted member detachably connected to the opposite end of the bar for detachable connection to the other vehicle, and means connecting the pivoted members so that one will be operated upon movement of the other.

6. A device of the character described for connecting vehicles in tandem comprising a longitudinally extending bar, a transversely extending bar pivotally connected adjacent each end of the longitudinally extending bar, a guide bar carried by each transversely extending bar and engageable with the longitudinally extending bar, and means connecting the transversely extending bars so that one will be operated upon movement of the other.

7. A device of the character described for connecting vehicles in tandem comprising a longitudinally extending bar having grooves therein, a transversely extending bar pivotally connected adjacent each end of the longitudinally extending bar, and means connecting the transversely extending bars and operating in the grooves of the longitudinally extending bar so that upon movement of one of the transverse bars the other will be operated.

8. A device of the character described for connecting vehicles in tandem comprising a longitudinally extending bar having grooves therein, a transversely extending bar pivotally connected adjacent each end of the longitudinally extending bar, a grooved arcuate shaped guide bar carried by each transversely extending bar, and cables connecting the transversely extending bars so that one will be operated upon movement of the other, the cables being received in and operating in the grooves of the arcuate shaped guide bars and the grooves of the longitudinally extending bars.

In testimony whereof I hereunto affix my signature.

PETER J. WOTZKA.